(12) United States Patent
Nelson (10) Patent No.: US 7,062,046 B2
(45) Date of Patent: Jun. 13, 2006

(54) METHOD AND SYSTEM FOR TRACING AN ANALOG COPY OF A DIGITAL WORK TO A UNIQUE DIGITAL COPY AND A PARTICULAR DIGITAL PLAYER

(75) Inventor: Terence J. Nelson, New Providence, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 836 days.

(21) Appl. No.: 09/767,635

(22) Filed: Jan. 23, 2001

(65) Prior Publication Data

US 2002/0097870 A1    Jul. 25, 2002

(51) Int. Cl.
*H04N 7/167* (2006.01)
(52) U.S. Cl. .................................. 380/201; 705/57
(58) Field of Classification Search ........ 380/201–202, 380/205, 210, 217, 220, 252–254; 713/176; 360/60; 369/84; 705/57
See application file for complete search history.

(56) References Cited

U.S. PATENT DOCUMENTS

| 4,595,950 | A  |   | 6/1986  | Lofberg |            |
|-----------|----|---|---------|---------|------------|
| 5,535,275 | A  | * | 7/1996  | Sugisaki et al. | 380/203 |
| 5,809,160 | A  |   | 9/1998  | Powell et al. |       |
| 6,061,656 | A  | * | 5/2000  | Pace    | 705/1      |
| 6,101,602 | A  | * | 8/2000  | Fridrich | 713/176   |
| 6,373,960 | B1 | * | 4/2002  | Conover et al. | 382/100 |
| 6,374,036 | B1 | * | 4/2002  | Ryan et al. | 386/94  |
| 6,665,489 | B1 | * | 12/2003 | Collart | 386/94     |
| 6,735,699 | B1 | * | 5/2004  | Sasaki et al. | 713/200 |
| 6,888,943 | B1 | * | 5/2005  | Lam et al. | 380/268   |

\* cited by examiner

*Primary Examiner*—Matthew Smithers
*Assistant Examiner*—MinhDieu Nguyen
(74) *Attorney, Agent, or Firm*—RatnerPrestia (57) ABSTRACT

A method for protecting a DVD video includes deriving a distinct version of the video data from sequential distinct data objects contained in a content database. Each data object has at least one member and selected data objects have at least two members that produce discernibly different analog output signals. In the exemplary embodiment, the members of a data object correspond to alternate "camera angles" in the DVD context. By selecting among alternate data objects available in the content database, the identity of an agent who is to be responsible for that copy is encoded in the particular copy. A modified player encodes the identity of the player into the reproduced analog video signal by making choices from among the members of the selected multi-member data objects.

15 Claims, 7 Drawing Sheets

| data set number | CE(A,W) | 1st set of data objects | 2nd set of data objects | data on disc $W_A$ |
|---|---|---|---|---|
| 0 | 0 | S(0) √ | S'(0) | S(0) |
| 1 | 1 | S(1) | S'(1) √ | S'(1) |
| 2 | 1 | S(2) | S'(2) √ | S'(2) |
| . | . | . | . | . |
| . | . | . | . | . |
| . | . | . | . | . |
| N-1 | 0 | S(N-1)√ | S'(N-1) | S(N-1) |
| 31 | 32 | 33 | 34 | 35 |

| data object number s | Multiple copies of signed player ID PE | first view | second view | Data used to generate analog signal |
|---|---|---|---|---|
| 0 | 0 | $L(W_A(0))\sqrt{}$ | $R(W_A(0))$ | $L(W_A(0))$ |
| 1 | 1 | $L(W_A(1))$ | $R(W_A(1))\sqrt{}$ | $R(W_A(1))$ |
| . | . | . | . | . |
| . | . | . | . | . |
| . | . | . | . | . |
| k | x | $W_A(k)$ | x | $W_A(k)$ |
| . | . | . | . | . |
| . | . | . | . | . |
| . | . | . | . | . |
| N-1 | 0 | $L(W_A(N-1))\sqrt{}$ | $R(W_A(N-1))$ | $L(W_A(N-1))$ |
| 71 | 72 | 73 | 74 | 75 |

Fig. 7

METHOD AND SYSTEM FOR TRACING AN ANALOG COPY OF A DIGITAL WORK TO A UNIQUE DIGITAL COPY AND A PARTICULAR DIGITAL PLAYER

FIELD OF THE INVENTION

The present invention is directed to providing a capability for tracing analog copies of content (e.g. movies) committed to digital media, for example digital video disks (DVDs), for early-window markets (e.g. in-flight airline entertainment).

BACKGROUND OF THE INVENTION

To be as economical as possible, applications for distributing digital works in niche markets should use media, playback equipment and display systems that are similar to mass-market versions produced for consumer or business applications. Typically, such digital works are subdivided into a multiplicity of data objects.

Co-pending U.S. patent application Ser. No. 09/519,253, filed on Mar. 6, 2000 in the name of Terence J. Nelson entitled "METHOD FOR RENDERING UNAUTHORIZED COPIES OF DIGITAL CONTENT TRACEABLE TO AUTHORIZED COPIES" which is incorporated herein by reference describes a method for creating digital works that may be traced to a particular individual. By this method, bits of license-enforcement data are embedded in a licensed copy of a digital work implicitly, by choosing one of a plurality of digitally distinct versions of each of a selected plurality of the data objects. These versions are advantageously prepared during the creation of a digital work so that each has the effect that the artist intended. The content, being customized, is delivered to a customer by means of a suitable writable media or by other methods that can be made secure.

Another key step in the method of the co-pending application is to inform customers, in advance, that their copy of the digital work will be customized for them. This knowledge will substantially inhibit customers from making and giving away second-generation copies because the small benefit is not worth the risk of encountering the copyright holder's enforcement processes.

DVD-Video can also be used advantageously in niche markets where so-called "early window" material is screened. However, extra precautions are needed to ensure that high-quality analog copies are not illicitly made and distributed. In particular, it is useful to prepare modified players to play modified discs that do not produce acceptable output in unmodified DVD-Video players. This may be done, for example, by encoding the video data onto the DVD using an encryption code or an encryption method that is not supported by consumer-market players. This complicates the task of obtaining an analog copy because access to the modified players would normally be restricted.

Operators of the early-window application, however, may be able to make analog copies without being detected. Therefore, it is also useful to be able to hold those persons with access to the DVD and the players, for example, flight attendants and mechanics, accountable for the discs and modified players entrusted to them. Accordingly, there is a need to provide a method of tracing analog copies of digital content delivered on writable media to the particular media and player responsible.

Providing the ability to trace an analog copy to a player raises the issue of extra cost in implementing an encoding function in a player. Thus, it is advantageous if the inventive system relies on an existing feature of DVD-Video to support this capability.

SUMMARY OF THE INVENTION

The present invention is embodied in a method for protecting content delivered on writable media to modified players each having an analog output.

The present invention is embodied in apparatus and a method for producing a traceable analog copy of an original digital work. The digital work includes a plurality of distinct portions. Each portion may be, for example, a scene or a group of pictures. The original work is made to include multiple parallel versions of at least selected portions of the work. These portions are arranged hierarchically. At the top of the hierarchy is the set of objects. Each object in a set is a digital representation of a portion of the work, and at least one alternate set is available for each portion. Each of the objects in the set of objects is digitally distinct and each member of each object is distinct in a way that can be perceived in the analog form of the member. Each version of each parallel portion is advantageously prepared during the creation of the digital work so that it has the effect that the artist intended.

The selected sets of data objects are written to a writable medium, with the selection encoding identifying information into the particular digital copy. This identifying information may further be stored in a digital identifier, which may then be used to identify the agent responsible for that particular copy.

When the work is played from the medium, a modified player plays respective selected members for each set of selected objects that include more than one member. The selection of the members encodes information identifying the player on which the work is being reproduced. Because each parallel member of an object is distinct in the analog signals that it produces, the identity of the player can be determined from characteristics of the sequence of portions in the analog work.

According to one aspect of the invention, the work is a DVD-video title, the objects are respective scenes of the video title and the members of a data object are respective DVD camera angles of the scene.

Another aspect of the invention is a method for tracing an analog copy of a digital work to the particular copy of the original digital work from which the analog copy was produced. The particular segments of the analog copy are compared to a plurality of members of data objects from said original digital work to determine which members of which data objects were present on said particular copy. This identification recovers bits of a copy tracking ID that was embedded in said unique copy. This ID provides copy tracking information directly, or optionally points to such information in a copy-tracking database maintained by the content provider.

BRIEF DESCRIPTION OF THE DRAWINGS

The organization and operation of this invention will be understood from a consideration of detailed descriptions of illustrative embodiments, which follow, when taken in conjunction with the accompanying drawings.

DETAILED DESCRIPTION OF THE INVENTION

In an exemplary embodiment, the writable medium is a DVD disc and the content is a DVD movie. The exemplary players are used in the early-window applications, such as airline movies, and are modified to play the content, which, in turn, is modified so that it will not play acceptably in consumer-market DVD players. Although the invention is described in the context of a DVD it is contemplated that it may be practiced with any digital work that is widely distributed, such as a computer game or other digital work that is ultimately expressed in analog form.

In an exemplary embodiment, the content is a particular copy of an original digital work written on the media as sequential distinct segments. The distinct segments are advantageously prepared during the composition of the digital work to ensure that they have the effect intended by the artist but nevertheless produce distinct analog outputs in a player. This may be done, for example, by using the camera angle feature of the DVD encoding scheme. This feature allows each segment, for example, a scene or a group of pictures, to be recorded on the disk, in parallel, from as many as nine different camera angles. In the exemplary embodiment of the invention, it is contemplated that the multiple segments may be versions of the same scene, each shifted by a few pixel positions relative to a reference scene. This would make the differences among the scenes Imperceptible to a viewer (i.e., artistically equivalent) but each scene would be sufficiently different to produce respectively different analog signals. When the work to be protected is a video game, the segments may be specific graphics that are displayed during the game or visually distinct versions of specific graphics.

The versions of the segments are arranged hierarchically in groups of two or more. The top of the hierarchy for a particular segment is a set of data objects. An exemplary set of data objects includes two or more individual data objects. A particular digital copy includes one set chosen from two or more alternate sets for each segment. A particular analog copy made from the digital copy includes one member from each set of objects on the digital copy. Each of these sets includes at least one member, and selected sets include multiple members.

The sets of data objects of each digital work are kept in a content database for use in copyright enforcement as well as for preparation of traceable copies. As described in the above-referenced patent application, by selecting from among multiple parallel objects in each of a group of sets, a particular copy of the digital work implicitly contains the identity of the agent who is to be responsible for that copy. In the exemplary embodiment of the invention, successive bits of an identifier that is unique to the agent are encoded as binary choices between successive first or second artistically equivalent but distinct sets of data objects.

As set forth above, each such data object may contain one member or more than one member. Thus, the selected data objects that encode the identity of the agent may each have one member or two or more members. The identity of the player is encoded by selecting a specific member from each of a selected number of data objects that include two or more members. The ultimate analog output signal uses only one member from each data object on the digital copy.

It is the modified player that chooses which member from each of the selected data objects in the digital copy to reproduce, in order to encode the identity of the player into the analog signal. In the exemplary embodiment of the invention, in which the content to be protected is a DVD-Video disc, the two members of each selected data object correspond to different camera angles of a respective scene. To aid in also determining the identity of the agent responsible for the DVD from the analog copy, where sets include parallel objects, each object of each such set may include members that are distinct, in their analog form, from all other analog members in the set of objects. Thus both the selection of the data object and the selection of the members from within the data object may be determined by analyzing the analog copy. As described above, the result is at least two versions of the scene with: 1) different views of the action, if truly different camera angles are used, or 2) no perceptible (to the viewer) difference in the action, but a measurable difference in the analog signal if the different members of each set are, for example, merely shifted relative to one another by a few pixel positions. A more thorough description of the camera angle feature of DVD video may be found in Jim Taylor's book *DVD Demystified*, McGraw-Hill, New York (1997) p. 173.

A modified player chooses between the members of the selected data objects using a signed digital identifier (digital ID) that is stored in a read-only memory (ROM) that is integral to the player. In the exemplary embodiment of the invention, this signed digital ID is encoded at the analog output of the player as a binary choice between the first and second members of the selected data objects that have two members. Other embodiments may have a digital ID allowing selection from more than two members of the selected data objects that have a plurality of members.

In the exemplary embodiment of the invention, the signed digital ID of a player is constructed by encoding a unique digital ID of the player using a public-key algorithm. In the exemplary embodiment, the digital ID is encrypted using a private key, known only to the copyright holder or its designated agent. The result is the signed digital ID which is stored into the ROM. A private key is used so that it is difficult to forge the signed digital ID. In an exemplary embodiment of the invention, the public key, the identity of the player and the names of all custodians who are responsible for the player are kept in an equipment-tracking database belonging to the copyright holder or to a person or company designated by the copyright holder to enforce the copyright.

When an unauthorized analog copy is found by the copyright holder, he or she compares the copy with the distinct analog output of the data objects available in the content database. This comparison is thereby able to determine which of the distinct members of which of the data objects were recorded. From this information, a particular digital player can be identified. The tracking database is then searched for this digital player identifier to identify the player from which the unauthorized analog copy was made. Therefore the copyright holder can read the signed digital ID of the player and retrieve information about the custodian of the player from the equipment-tracking database. In addition, if each of the members of each data object that was available to encode the identity of the agent also produce distinct analog outputs, a digital agent identifier can be generated from the analog copy. This digital agent identifier can be sufficient by itself or alternatively may be used to locate a record in a copy-tracking database to identify the agent who was responsible for the digital copy from which the unauthorized analog copy was made.

Thus the agent responsible for the digital copy that was used to make an unauthorized analog copy and the custodian of the digital player in which the analog copy was made can both be identified. The agents and custodians are made aware of this traceability of unauthorized analog copies when they are provided with the DVD and the player. This knowledge substantially inhibits them violating the trust placed in them.

Figure 1:
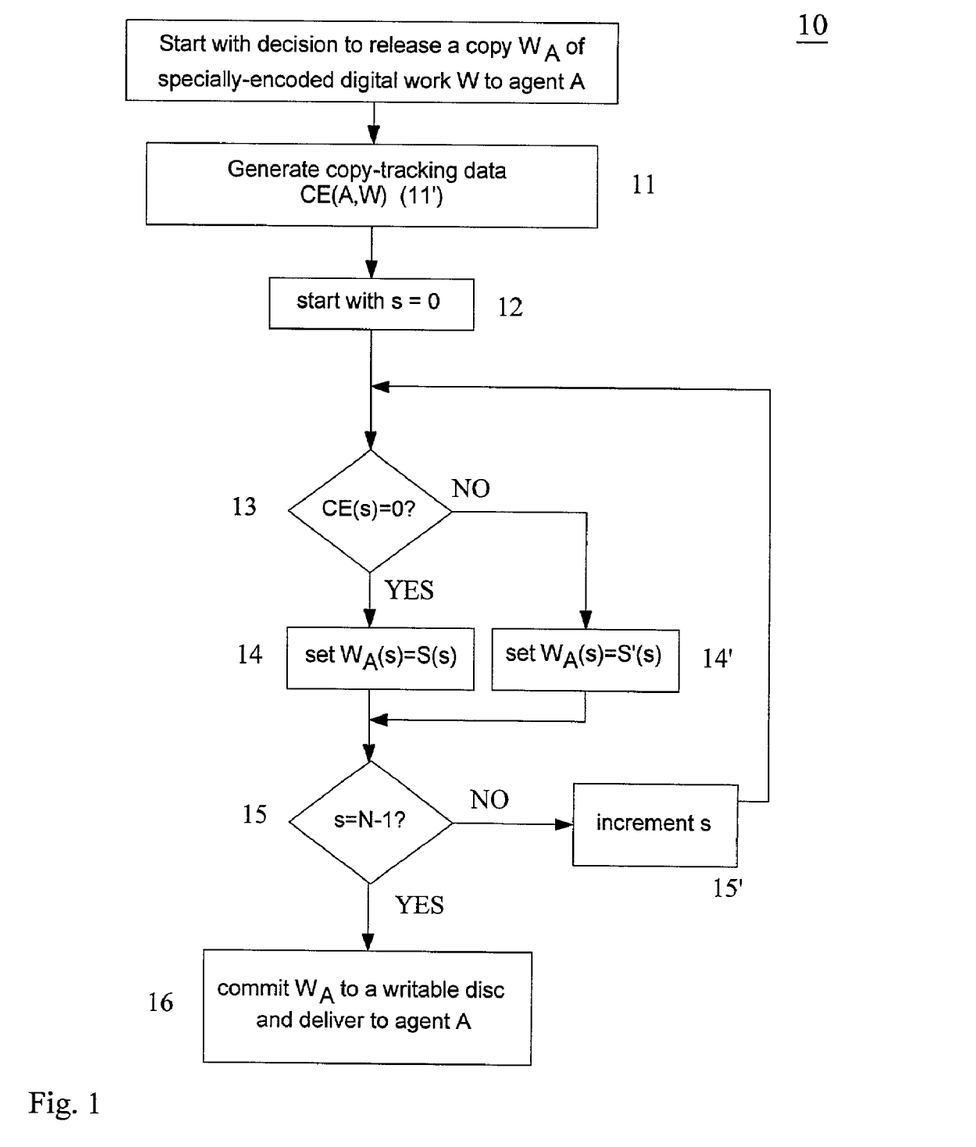
FIG. 1 is a flow-chart diagram that illustrates steps that a content provider can follow to customize an authorized copy of a digital work on writable media so that subsequent unauthorized copies are traceable to an agent who is responsible for the copy.

FIG. 1 shows steps comprising a method (10) for preparing a unique copy $W_A$ of a digital work W for an agent A. In an exemplary embodiment of the invention, W is a DVD-Video movie. At step 11, a copy-tracking identifier CE(A,W) (11') is generated. This identifier fully identifies the agent A and associates him or her with the unique digital copy $W_A$. As with the digital ID of the player, described above, the identifier 11' may be a signed data object, that is to say, an identifier that is encrypted using a private key.

At step 12 of method 10, an index s is initialized and then used at step 13 to access the s-th bit of the copy-tracking identifier CE(A,W) (11'). If $CE_S(A,W)$ is zero, the method branches to step 14; otherwise, the method branches to step 14'. At either step, a set of data objects is retrieved from a content database (20) shown in FIG. 2. A typical record (21) in this content database also contains a field identifying the digital work W (22) and the number N (23) of data objects in W. Two sets of data objects S(s) (25) and S'(s) (26) are associated with at least selected values of the index s (24). Although the exemplary method 10 selects from sets containing pairs of data objects, it is contemplated that a greater number of alternative sets may exist and the identifier may be a trinary, quatranary or other n-ary value that is encoded by the appropriate selection of a single data object from the group of alternative data objects.

Figure 2:
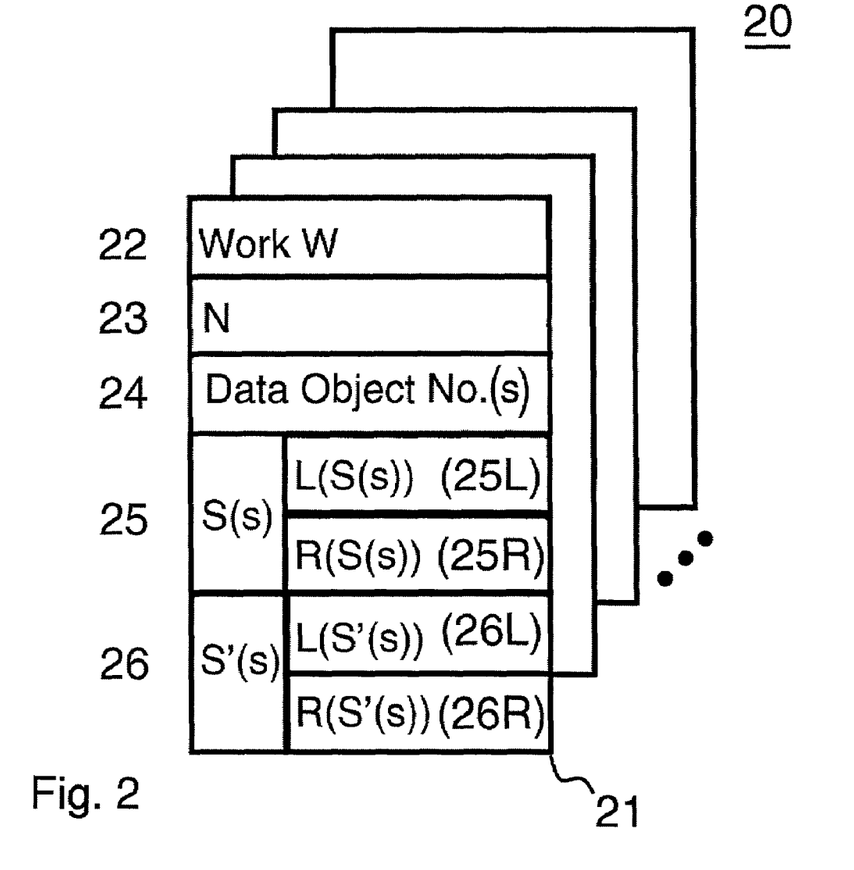
FIG. 2 is a data structure diagram that illustrates a record in a content database containing distinct alternate sets and subsets of data for each digital work in the database.

Also in the exemplary embodiment selected data objects may have only one member or it may have two or more members. When a data object has two members, such as L(S(s)) (25L) and R(S(s)) (25R), they are video objects of equal length as provided for by the multi-angle feature of DVD-Video, and selection during playback is possible. When a data object has only one member, it is referred to, in the exemplary embodiment, as L(W(s)) or L(W'(s)). Although the exemplary method 10 selects from data objects containing pairs of members, it is contemplated that a greater number of alternative members may exist and the identifier may be a trinary, quatranary or other n-ary value that is encoded by the appropriate selection of a single member from the group of alternative members.

The member or members of each data object are advantageously defined during the creation of the digital work. At that time, the artist creating the work can ensure that each member creates the effect intended and is nevertheless distinguishable, even in copies made at the analog output of a player. Moreover, the data objects may be modified, for example, by using a proprietary encryption key or encryption method, to produce acceptable playback only in the modified DVD-Video players.

Returning again to FIG. 1, if the s-th bit of the copy-tracking identifier CE(A,W) (11') is zero, the method branches to step 14 and $W_A(s)$ is set equal to S(s) (25). Otherwise, the method branches to step 14' and $W_A(s)$ is set equal to S'(s) (26), which, as described above, is distinct from S(s). After step 14 or 14', method 10 proceeds to step 15, where the current value of s is examined. If s equals N−1, the customized work $W_A$ is completely defined. If not, s is incremented at step 15' and the process continues from step 13, as described above. After the last data object is assigned, the process terminates at step 16. At step 16, $W_A$ is committed to a writable disk and delivered to the agent A.

Figure 3:
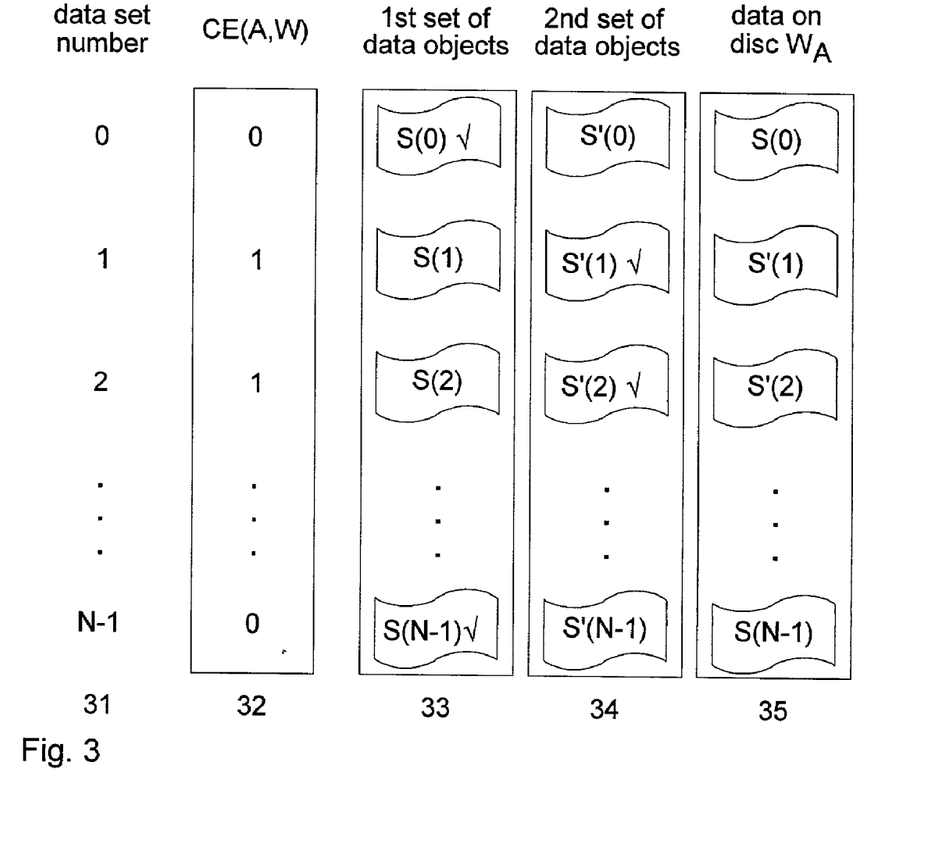
FIG. 3 is a data structure diagram that illustrates choices made between distinct sets of data for each data object of a traceable copy of a digital work.

FIG. 3 summarizes the effect of method 10 for preparing a unique copy $W_A$ (35) of a digital work W (22) for an agent A. The copy-tracking identifier CE(A,W) (11', 32) is given in the second column next to the column of data-set numbers (31). Depending on the value of the bit $CE_S(A,W)$, a data object is accepted from the first column of data objects S(s) (25, 33) or the second column S'(s) (26, 34), each of which may itself include multiple members, into the customized digital work $W_A(s)$ (35). Although, in the exemplary embodiment of the invention, selected data objects S(s) or S'(s) each has only two members, it is contemplated that each such object may have three or more members.

Figure 4:
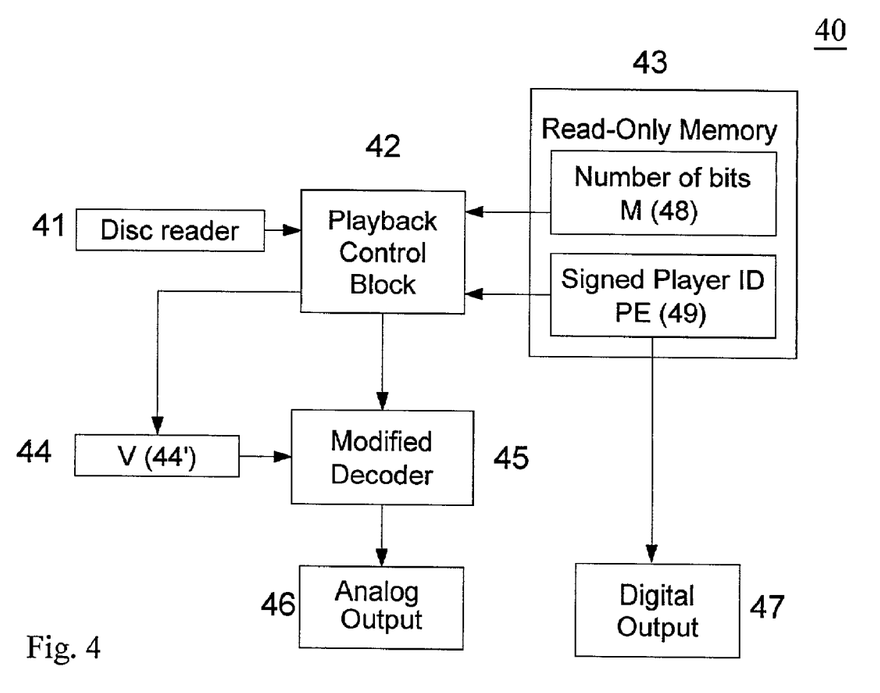
FIG. 4 is a block diagram of a player modified to encode its ID in the analog output signal when an interleaved stream of video objects is read.

FIG. 4 is a simplified block diagram of a modified DVD player (40) that has a modified playback-control block (42) and a modified decoder (45). The modified playback control block accepts data objects from a disc reader (41) and a signed player ID data object PE (49) from an internal read-only memory (43). The read-only memory also provides a number M (48) equal to the number of bits in PE.

Figure 5:
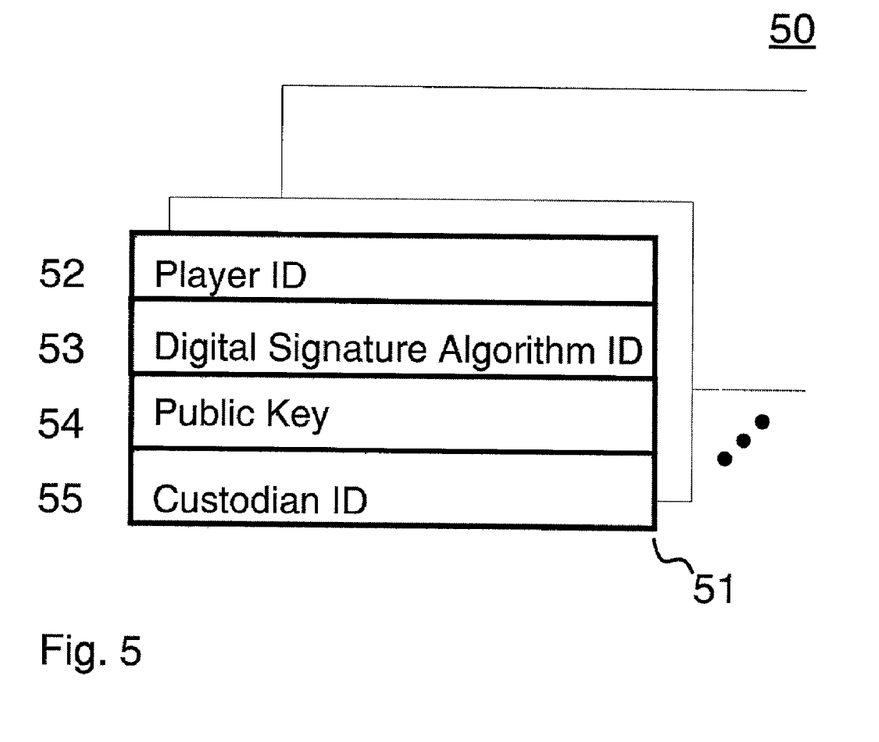
FIG. 5 is a data structure diagram that illustrates an equipment-tracking database that may be used to identify each playback unit and its custodian, and other information for authenticating the player ID.

FIG. 5 is a description of the equipment-tracking database (50) used to track modified DVD players (40). Each exemplary database record stores a digital ID (52) for the player, previously signed with a private key; the digital signature algorithm (53) used for that player; and the public key (54) needed to authenticate a signed digital ID. Each database record also stores one or more IDs (55) for the custodian(s) of the player. When an unauthorized analog copy has been found and the ID (52) of the player used to produce the unauthorized analog copy has been determined, the ID(s) (55) of the custodian(s) of that player can readily be determined, so those persons can be held accountable.

Returning to FIG. 4, notice that the modified DVD player also has a digital output port (47). Using this port, the custodian can read the signed digital ID PE (49). The custodian is also able to read the player ID (52), public key (54) and choice of digital signature algorithm (53) from the equipment-tracking database. Custodians can, therefore, use the digital signature algorithm to determine if the signed player ID PE (49) is authentic. This may be done, for example, by decoding the signed digital ID and comparing it to an identifier that is printed on the outside of the player. Custodians are required to remove a player from service when its player ID becomes unauthentic. This change may occur, for example, as a result of a malfunction. A change of this type alerts the custodian that someone may have tampered with the player and its continued use may compromise the security of digital content played in it.

In FIG. 4, the modified player-control block (42) receives successive data objects $W_A(s)$ (35) from the disc reader (41). The modified player-control block uses successive bits of the signed player ID PE (49), as needed, to decide which member of each data object to transfer to the modified decoder (45). This selection process determines which member of a data object, for example, L(S(s)) (25L), is selected to be converted to an analog signal. The modified playback control unit uses the selected member to define a temporary video pre-output V (44'). The modified playback control block then causes the modified decoder to provide V (44') to an analog output terminal (46). In one exemplary embodiment of the invention, V (44') and the decoder may be selected and configured on the DVD so that an acceptable analog output is obtained from the modified player but only unacceptable output is obtained from an unmodified DVD-Video player.

Figure 6:
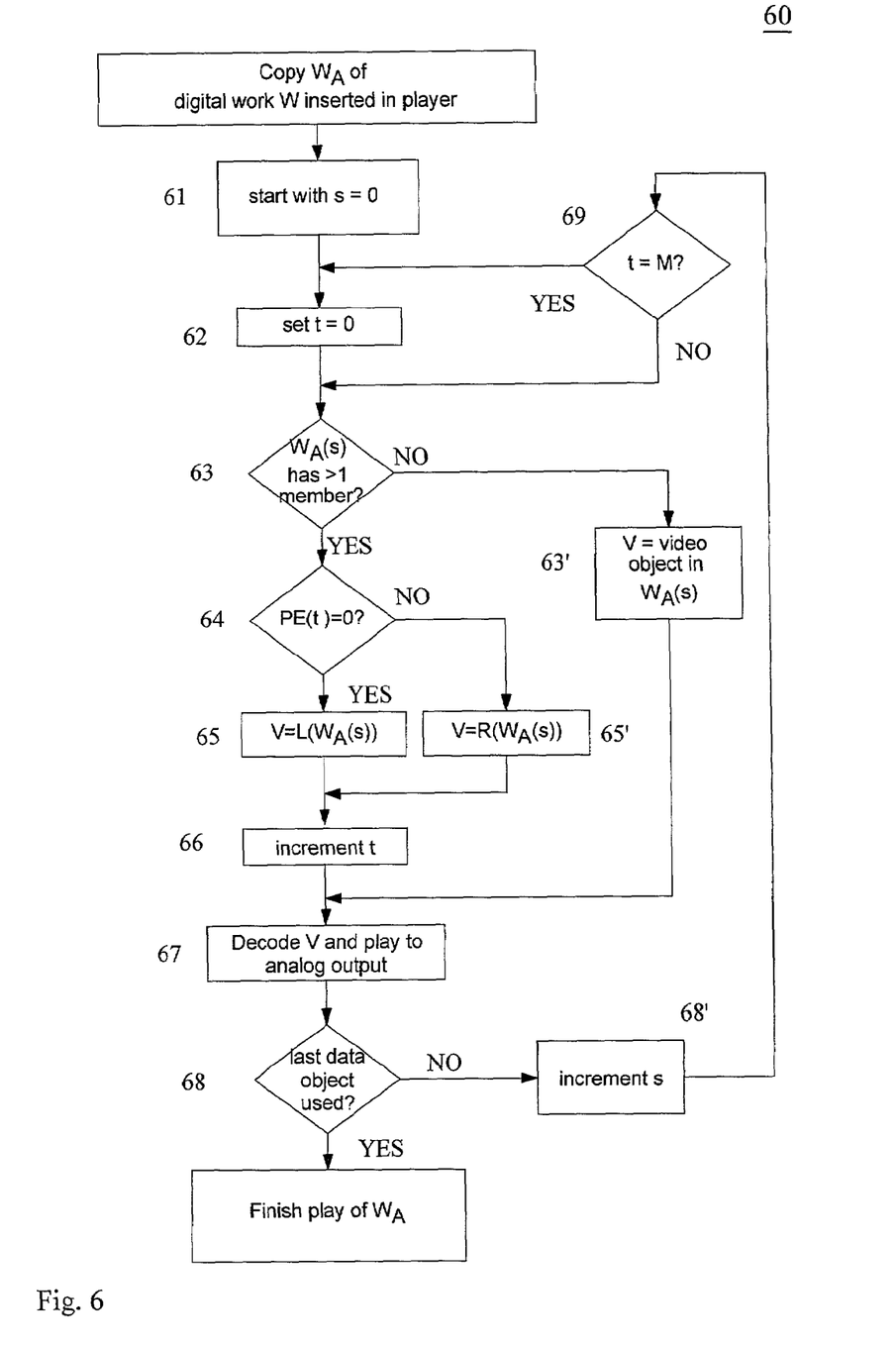
FIG. 6 is a flow-chart diagram that illustrates steps that a modified player may take to encode its identifying data into the analog video at its output.

FIG. 6 shows a method (60) used by an exemplary modified player (40) to encode its signed ID PE (49) in the player's analog output signal (46). The method begins when a disc is inserted in the disc reader (41) of the player. At step 61, the set number s is initialized to 0. At step 62 a bit position index t in PE is also set to 0. At step 63, the data object $W_A(s)$ is examined to see if it has 1 or 2 members. If $W_A(s)$ has only one member, the method branches to 63' where the single member is used to define the temporary video pre-output V (44'). After step 63', the method branches to step 67, where V (44') is played to the analog output (46).

If, at step 63, the data object $W_A(s)$ has two members, control transfers to step 64 where the t-th bit of the signed player ID PE (48) is examined. If PE(t) is zero, the method branches to step 65 where the temporary pre-output V (44') is set equal to $L(W_A(s))$. Otherwise, the method branches to step 65', where V (44') is set equal to $R(W_A(s))$. After step 65 or 65', the method proceeds to step 66 where the bit position t is incremented. The method then continues to step 67, where V (44') is decoded and played to the analog output (46).

After step 67, the method proceeds to step 68, where a test is made to see if all the data objects on the disc have been used. If there are more data objects, the method branches to step 68', where s is incremented. After step 68', the method proceeds to step 69, where t is tested. If t has been incremented to M (48) of the signed digital ID stored in the read-only memory (43), then the method continues from step 62 again, where t will be reset to zero. If, at step 69, t is less than M (48), the method continues from step 63 again.

Figure 7:
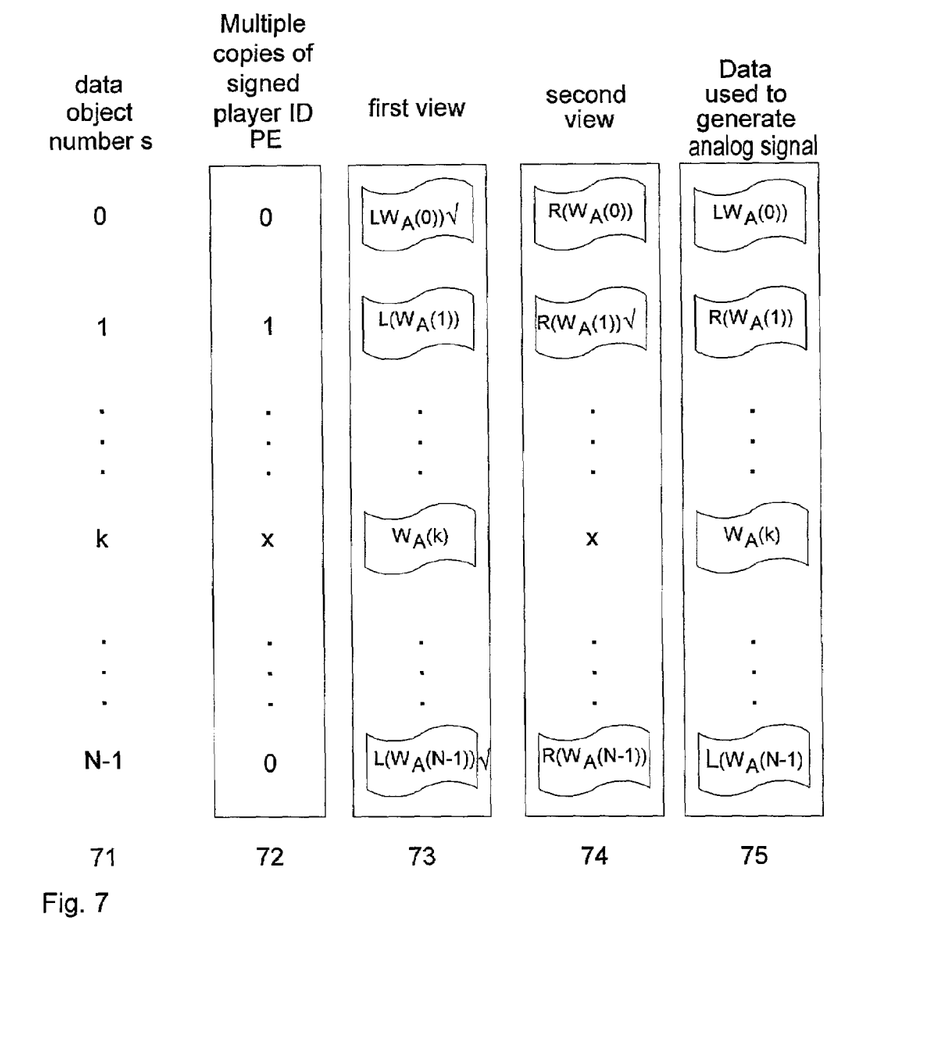
FIG. 7 is a data structure diagram that illustrates choices made by a modified player between distinct versions of certain data objects of a traceable copy of a digital work for playback to an analog output.

FIG. 7 summarizes the effect of method 60 for encoding the signed player ID PE (49, 72) in the signal at its analog output (46). The signed player ID PE (49) is given in the second column (72) next to the column of data-object numbers (71). Depending on the value of the s-th bit of the copy-tracking identifier CE(A,W) (11'), a data object is accepted from first column of data objects S(s) (25, 33) or the second column S' (s) (26, 34) into the customized digital work $W_A(s)$ (35).

When the holder of the copyright of a digital work W (22) discovers an unauthorized analog copy, he or she can compare the copy with the output that results from each member (25L, 25R, 26L, 26R) of both data objects (25, 26) at each data-object number s (24) in the content-tracking database (20). In the exemplary embodiment of the invention, the copy-tracking identifier CE(A,W) (11') is recovered from the sets of data objects that match, and the signed player ID PE (49) is recovered from the members in each data object that match the unauthorized analog copy. By reference to the content-tracking data object, the responsible agent A is identified, and by reference to the equipment-tracking database, the responsible custodian is identified. The owner may then take appropriate enforcement actions based on the identification of the agent A and the custodian (55) of the player (40).

While the invention has been described by reference to specific embodiments, this was for purposes of illustration only. Numerous alternative embodiments will be apparent to those skilled in the art and are considered to be within the scope of the invention.

What is claimed:

1. Apparatus for producing a traceable analog version of a digital work, comprising:
   means for reading sequential data objects of said digital work, at least one of said data objects including multiple artistically equivalent members, each of the multiple members representing a distinct analog output signal; and
   means for selecting one member from among the multiple members for the at least one of said data objects according to a digital identifier for said apparatus; and
   means of transforming the selected data objects, including the one member, into an analog signal;
   wherein said digital identifier is coded by the selection of the one member from each of the at least one of said data objects and the analog signal identifies a unique copy of the digital work.

2. Apparatus according to claim 1 wherein said digital work is a DVD-Video title.

3. Apparatus according to claim 1 wherein said digital work is a software game.

4. Apparatus according to claim 1 wherein at least one of the data objects includes only one member and the means for transforming transforms all of the data objects having only one member.

5. Apparatus for producing a traceable analog version of a digital work, comprising:
   means for reading sequential data objects of said digital work, at least one of said data objects including multiple artistically equivalent members, each of the multiple members representing a distinct analog output signal; and
   means for selecting one member from among the multiple members for the at least one of said data objects according to a digital identifier for said apparatus; and
   means of transforming the selected data objects, including the one member, into an analog signal;
   wherein said digital identifier is coded by the selection of the one member from each of the at least one of said data objects;
   wherein:
   a plurality of the data objects include multiple members;
   said digital identifier is a multi-digit value that is unique to said apparatus; and
   the means for selecting associates each digit of the digital identifier with a respective one of the data objects having multiple members and selects one of the multiple members from each data object responsive to the digit.

6. Apparatus according to claim 5 wherein said digital identifier is binary and each of the data objects having multiple members has two members.

7. Apparatus according to claim 6 wherein the digital identifier includes a binary value that Is encrypted using a private key.

8. A method for tracing an analog copy of a digital work to apparatus that produced said analog copy, comprising the steps of:
  a. determining the original digital work from which said analog copy was produced, the original digital work including a plurality of sets of digital objects, each digital object including a set of members;
  b. determining a sequence of data objects that produced said analog copy, each data object corresponding to a respective segment of the analog copy;
  c. comparing the segments of the analog copy to the plurality of sets of data objects of said original digital work to determine it each segment corresponds to a data object having a plurality of artistically equivalent members and, for each such data object, determining which of said plurality of members corresponds to the segment in the analog work;
  d. creating a digital identifier from a sequence of the respective members that corresponds to the respective segments of the analog work;
  e. using said digital identifier to identify the apparatus that made the analog copy of the digital work.

9. A method according to claim 8, wherein the digital identifier is encrypted using a private key and the step of using the digital identifier to identify the apparatus that made the analog copy of the digital work includes the step of applying a corresponding public key to the digital identifier to recover a value representing the identity of the apparatus.

10. A method according to claim 8, wherein said digital work Is a DVD-Video Title.

11. A method according to claim 8, wherein said digital work is a software game.

12. A method according to claim 8, wherein said apparatus is assigned to at least one custodian, and the digital identifier is also used to identify said at least one custodian.

13. Apparatus for producing a copy of a digital work that is traceable to an agent responsible for the copy of the digital work and that is configured to produce analog versions of the copy of the digital work which are traceable to a particular player, comprising:
  means for receiving a plurality of sequential data objects of said digital work, at least one of said sequential data objects having a corresponding artistically equivalent alternate data object that is measurably different from the one of said sequential data objects when the one data object and the alternate data object are reproduced in analog form and least one of said sequential data objects including a plurality of members;
  means for writing a plurality of the sequential data objects and alternate data objects to a writable medium, said means for writing including means for selecting one of said at least one data object and said alternate object to be written to the writable medium responsive to an identifier identifying said agent;
  wherein at least one of the data objects written to said writable medium includes a plurality of members.

14. Apparatus according to claim 13 wherein said digital work is a DVD/video title.

15. Apparatus according to claim 13 wherein said digital work is a software game.

* * * * *